United States Patent [19]
Hofmann

[11] Patent Number: 6,119,832
[45] Date of Patent: Sep. 19, 2000

[54] PNEUMATIC MOVEMENT DAMPER

[75] Inventor: Heinz A. Hofmann, Treuchtlingen, Germany

[73] Assignee: Hoerauf & Kohler Verwaltungs KG, Augsburg, Germany

[21] Appl. No.: 09/214,085

[22] PCT Filed: Jun. 13, 1997

[86] PCT No.: PCT/DE97/01202

§ 371 Date: Dec. 21, 1998

§ 102(e) Date: Dec. 21, 1998

[87] PCT Pub. No.: WO97/49936

PCT Pub. Date: Dec. 31, 1997

[30] Foreign Application Priority Data

Jun. 21, 1996 [DE] Germany ............................ 296 10 915

[51] Int. Cl.[7] ....................................................... F16F 9/34
[52] U.S. Cl. ............................. 188/322.13; 16/49; 16/66; 188/322.17; 188/317
[58] Field of Search ........... 188/322.13, 322.15–322.19, 188/322.22, 297, 271, 301, 281, 284, 287, 280, 316, 317; 16/49, 66; 267/64.15, 64.23, 64.11

[56] References Cited

U.S. PATENT DOCUMENTS

| | | |
|---|---|---|
| 3,059,269 | 10/1962 | Selinger et al. . |
| 3,083,399 | 4/1963 | Moran et al. . |
| 3,555,591 | 1/1971 | Sogoian ...................................... 16/49 |
| 3,937,450 | 2/1976 | Bauer . |
| 4,877,226 | 10/1989 | Taylor ...................................... 16/66 X |
| 5,157,806 | 10/1992 | Wartian ...................................... 16/66 |
| 5,471,708 | 12/1995 | Lynch . |

FOREIGN PATENT DOCUMENTS

| | | |
|---|---|---|
| 0 198 180 | 10/1986 | European Pat. Off. . |
| 341 426 | 11/1989 | European Pat. Off. . |
| 562 284 | 9/1993 | European Pat. Off. . |
| 2 666 857 | 3/1992 | France . |
| 239 812 | 2/1911 | Germany . |
| 689 02 431 | 1/1993 | Germany . |
| 42 33 037 | 4/1994 | Germany . |
| 295 18 171 | 1/1996 | Germany . |
| 296 00 438 | 5/1996 | Germany . |

*Primary Examiner*—Robert J. Oberleitner
*Assistant Examiner*—Melanie Talavera
*Attorney, Agent, or Firm*—Flynn, Thiel, Boutell & Tanis, P.C.

[57] ABSTRACT

A pneumatic movement damper has a cylinder closed on one side, a piston that slides within the cylinder and is connected to a piston rod, a packing mounted on the piston and a throttle passage arranged in the piston for connecting the two cylinder spaces separated by the piston and the packing. The piston has a conical seat that widens away from the piston rod and a flange part adjacent to the largest diameter of the conical seat. The packing has a truncated recess that matches the conical seat and can move within limits in the axial direction between the flange part and a ring-shaped flange arranged on the piston rod at an axial distance from the flange part. Radial grooves are provided in the faces of the flange part and ring-shaped flange normal to the axis of the cylinder and oriented towards the packing. The groove provided in the flange part has a smaller cross-section than the groove arranged in the ring-shaped flange and forms the throttle passage. A flow passage is provided between the conical seat and the recess.

11 Claims, 2 Drawing Sheets

PNEUMATIC MOVEMENT DAMPER

FIELD OF THE INVENTION

The invention concerns a pneumatic movement damper with a cylinder which is closed on one side, with a piston which slides within the latter and which is connected to a piston rod, with a packing mounted on the piston and with a throttle passage provided on the piston for connecting the two cylinder spaces separated by the piston and the packing.

BACKGROUND OF THE INVENTION

Pneumatic dampers of this type (DE 296 00 438 U1) are frequently used for slowing down the movement of a flap which can swing open, for example the flap of a glove compartment in a motor vehicle. Flaps of this type nowadays are generally very heavy and formed in such a way that a part of the contents of the glove compartment is also situated in said flaps. When the glove compartment lock is undone, the flap falls into the open position with the force of gravity. In order that the flap does not suddenly swing down and fall on the passenger's legs, the pneumatic movement damper should slow down the movement when the flap is opened. However, when the flap is being closed, the movement damper should reciprocally impede the closing movement as little as possible.

The known movement damper of the type mentioned above has an axial boring provided as a throttle passage in the piston. When the piston is retracted from the cylinder the packing forms a seal with the cylinder wall and air alone should pass through this throttle boring. In order to achieve an adequate damping effect, the throttle boring should have a diameter of only circa 0.1 mm. When the piston is produced from plastic material difficulties are presented in producing such a fine boring. This can generally only be achieved by a laser beam for which purpose a separate work process is required which increases production costs. The fine boring can also lead to defective functioning or even failure of the movement damper. Namely, dirt particles can be deposited in front of the boring or even in the boring causing the boring to be partly or totally blocked. In the former case then, the opening movement of the flap occurs too slowly. In the latter case, the flap can no longer be dropped down at all. While closing the flap the piston is pushed into the cylinder. Hereby, a pressure cushion would build up in the cylinder space located between the cylinder base and the piston. In order that this does not occur, the packing is formed elastically so that it can be raised from the cylinder wall and air can then pass through the annular gap which is thus formed. However, experience has shown that such elastic packings made of plastic material lead to a jerky movement even when the cylinder is formed from plastic material.

Thus, the object underlying the invention is to create a pneumatic movement damper of the type mentioned at the beginning which can be easily produced and which is operationally reliable.

SUMMARY OF THE INVENTION

This is achieved according to the invention in that the piston has a conical seat widening out from the piston rod and a flange part adjacent to the largest diameter of the conical seat. The packing has a truncated recess corresponding to the conical seat and can move within limits in the axial direction between the flange part and an annular flange arranged on the piston rod at an axial distance from the flange part. Radial grooves are provided in the surfaces of the flange part and the annular flange, the surfaces extending perpendicular to the axis of the cylinder and oriented towards the packing, and the groove provided in the flange part having a smaller cross-section than the groove arranged in the annular flange and the former forming the throttle passage. A flow passage is provided between the conical seat and the recess.

In the movement damper according to the invention, the packing can move in a limited fashion relative to the piston. When the piston rod is retracted out of the cylinder, the front surface forms a tight seal against the flange part and the air passing through the flow passage between the conical seat and the recess can then only pass through the radial groove in the flange part. Since this groove has a relatively small cross-section, a large throttle effect occurs and hence the desired damping of the piston movement when the piston rod is retracted. On the other hand, if the direction of thrust is reversed and the piston rod is pushed into the cylinder then, as a result of the braking effect between the packing and the inner cylinder wall, the packing is at first held tight until the annular flange abuts onto the other front side of the packing and entrains the latter. During the reversal in movement, the conical seat can be detached from the truncated recess of the packing in a simple and frictionless manner. This is a substantial advantage of the movement damper according to the invention which also contributes to its operational reliability. As soon as the packing abuts onto the annular flange, air can pass practically without hindrance through the annular gap formed between the conical seat and the recess and in addition pass through the radial groove—for practical purposes several such radial grooves are provided—in the annular flange. Since this groove or these grooves may have any size of cross-section, they cause practically no throttle effect so that the piston and the piston rod can be pushed without hindrance into the cylinder. Also contributing to the unimpeded entry of the piston rod is the fact that during entry the truncated recess of the packing is raised from the conical seat. As a result, the packing loses its inwardly directed radial support so that during entry it is pressed with less force onto the cylinder wall and consequently the friction between both parts is considerably reduced. The use of a radial groove in the flange part of the piston as a throttle passage has the advantage that this groove can be easily produced when the piston is being injection-moulded from plastic material and moreover there is virtually no danger of blockage. If by chance dust particles should get into the throttle groove, these can be easily removed again by pushing the piston into the cylinder since, when the piston is being pushed inwards, the packing is raised from the flange part and hence the throttle groove is open towards the packing. By virtue of the stream of air arising when the piston is moving inwards, dust particles which have possibly got into the throttle groove, are blown out again from the latter. In the movement damper according to the invention, air is directed through between the packing, which is raised from the flange part and the conical seat, and the previously mentioned parts and also the radial grooves in the annular flange. Since sufficiently large cross-sections can be provided here there is no danger of blockage and additionally there is no requirement for the sealing lip of the packing to be raised from the cylinder wall when the piston is being pushed in. Consequently, the packing and also its sealing lip can be produced from relatively rigid plastic material, especially from a type incorporating molybdenum. This has the advantage that any jerkiness can be avoided when the piston rod is moved.

BRIEF DESCRIPTION OF THE DRAWINGS

The invention is explained in greater detail in the following with reference to one embodiment, which is given by way of example and which is represented in the drawing, which shows.

DETAILED DESCRIPTION

Figure 1:
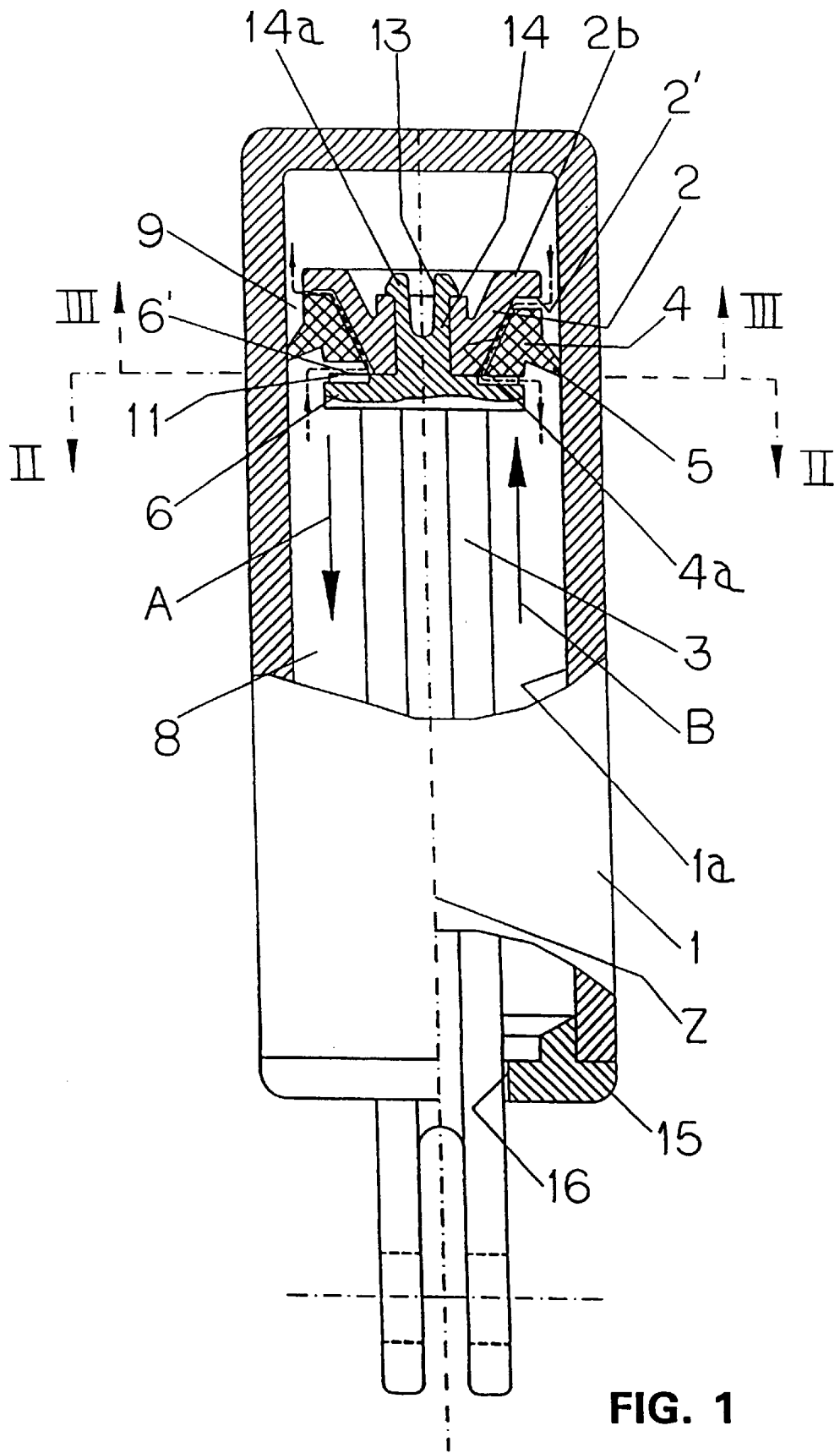
FIG. 1 is a side view of the movement damper partly in axial section.
Figure 2:
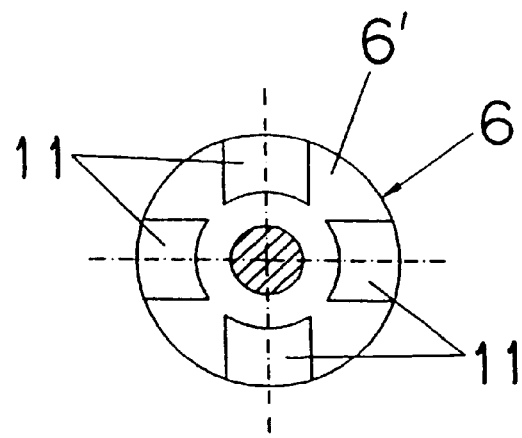
FIG. 2 is a view of the annular flange according to line II—II of FIG. 1.

The pneumatic movement damper consists firstly of a cylinder 1 which is produced from plastic material. In the cylinder 1, there is a piston 2 which is mounted to slide and which is connected to the piston rod 3. The piston 2 and the piston rod 3 are also made of plastic material. The piston 2 has a conical seat 2a widening out from the piston rod 3 and has a flange part 2b adjacent to the greatest diameter of same. On the piston 2, there is arranged a packing 4 which has a truncated recess 4a corresponding to the conical seat 2a. The packing has a sealing lip 5 adjacent to the cylinder wall 1a. The packing 4 can be moved furthermore within limits between the flange part 2b and an annular flange 6 which is arranged on the piston rod 3 at an axial spacing from the flange part 2b. The packing 4 is shown in FIG. 1 in the position which it adopts during retraction of the piston rod 3 in direction A, while on the right in FIG. 1 the packing 4 is drawn in the position which it adopts when the piston rod 3 is being pushed in, in direction B.

The flange part 2b has a radial groove 7 in its surface 2' extending perpendicular to the cylinder axis Z and oriented towards the packing 4. The groove 7 can also have a stepwise tapering cross-section. When the packing 4 abuts onto the flange part 2b during retraction of the piston rod in direction A, this groove 7 then forms the single throttle passage through which air can stream from the lower cylinder space 8 into the upper cylinder space 9.

Furthermore, the conical seat is also provided with a groove 10 extending along one of its sleeve lines. However, this groove 10 can have a greater cross-section than the groove 7 or parts of same. The annular flange 6 has in its surface 6' oriented towards the packing 4 four grooves 11, the cross-section of which when added together is considerably greater than the cross-section of the throttle groove 7.

For practical purposes, the piston 2 and the piston rod 3 are two separate parts which can be connected to one another. The piston 2 has a central boring 12 and is pushed up onto a projection 14 of the piston rod provided with axial slots 13.

Catching noses 14a which project radially outwards on the free end of the projection 14 are provided for mounting the piston 2.

In order to produce movement dampers with varying damping effect it is necessary only to produce different pistons 2 which differ from one another only by the cross-section of their radial grooves 7. These pistons are then connected to the piston rod 3 alternatively by being pushed onto the projection 14.

The piston rod 3 and the annular flange 6 are made expediently from one part and are likewise injection-moulded from plastic material.

It is furthermore expedient to provide the cylinder 1 at its second end with a cover 15 which has an opening 16 for the piston rod 3 to pass through. This cover 15 by and large impedes dust and other foreign bodies from penetrating into the interior of the cylinder 1. In addition, the opening 16 in the cover 15 serves to guide the piston rod 3. However, there may be sufficient clearance present here between the piston rod 3 and the opening 16 to make possible lateral divergence of the piston rod 3 relative to the cylinder axis Z within predetermined limits.

In order to avoid jerkiness during displacement of the piston rod 3, the packing 4 should be produced from sufficiently hard plastic material, especially polyoxymethylene (=POM) with incorporated molybdenum.

The functioning of the new movement damper is as follows:

When the piston rod 3 is retracted in direction A out of the cylinder 1, the packing 4 is at first held tight by virtue of the friction between the sealing lip 5 and the inner cylinder wall 1a. The flange part 2b forms a tight seal with the upper front surface of the packing 4. During further retraction of the piston rod 3 in direction A, a vacuum is formed in the upper cylinder space 9. However, air can still pass through the groove 10 in the conical seat 2a and through the radial groove 7 in the flange part 2b from the lower cylinder space 8 into the upper cylinder space 9. The stream of air is hereby throttled in the groove 7 with the small cross-section. This leads to the desired movement damping during retraction of the piston rod 3 in direction A.

However, when the direction of movement is reversed and the piston rod 3 is pushed into the cylinder 1 in direction B, the piston is moved at first upwards relative to the packing 4 which is held tight by means of friction, as a result of which the conical seat 2a is raised from the truncated recess 4a. Upon further displacement, the annular flange 6 comes to rest on the lower front surface of the packing 4. The air can now stream through the annular gap, formed between the flange part 2b and also the conical seat 2a and the packing 4, and the radial grooves 11 which have a relatively large cross-section as is shown in FIG. 1 on the right with the result that an unimpeded movement of the piston rod 3 in direction B is assured.

Figure 3:
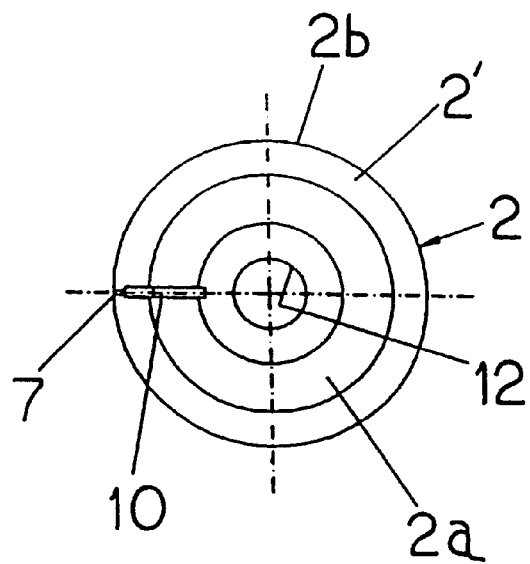
FIG. 3 is a view of the piston according to line III—III of FIG. 1.

It is expedient to arrange the flow passage 10 and the radial groove 7 in the flange part 2b, as is shown in FIG. 3, on a common axial section of the piston 2 and for them to discharge directly into one another. In this manner, the number of passages is kept small and the entire length of the connecting passages between the two cylinder spaces is short.

What is claimed is:

1. A pneumatic movement damper includes a cylinder closed on one end, a piston which slides within the cylinder and which is connected to a piston rod, a packing mounted on the piston and a throttle passage provided on the piston for connecting two cylinder spaces separated by the piston and the packing, wherein the piston includes a conical seat widening out from the piston rod and a flange part adjacent to the largest diameter of said conical seat, the packing having a truncated recess corresponding to the conical seat and movable within limits in an axial direction between the flange part and an annular flange arranged on the piston rod at an axial distance from the flange part, radial grooves are provided in surfaces of the flange part and the annular flange, said surfaces extending perpendicular to the axis of the cylinder and oriented towards the packing, and at least one of the radial grooves provided in the flange part having a smaller cross-section than the groove arranged in the annular flange, the at least one groove in the flange part forming the throttle passage and a flow passage is provided between the conical seat and the recess.

2. The movement damper according to claim 1, wherein the flow passage is formed by a conical seat groove arranged in the conical seat and extending from the flange part to the annular flange.

3. The movement damper according to claim 1, wherein the radial groove in the annular flange comprises one of several radial grooves provided in the annular flange.

4. The movement damper according to claim 1, wherein the piston and the piston rod comprise two separate parts and the radial grooves have different cross-sections in the flange part.

5. The movement damper according to claim 4, wherein the piston includes a central boring, the piston being pushed onto a projection of the piston rod provided with axial slots provided on a free end of the projection and projecting radially outwardly for mounting the piston.

6. The movement damper according to claim 1, wherein the piston rod and the annular flange are made as one-piece and consist of plastic material.

7. The movement damper according to claim 1, wherein the cylinder is provided at a second end with a cover having an opening for the piston rod to pass through.

8. The movement damper according to claim 1, wherein the packing is made from polyoxymethylene incorporating molybdenum.

9. The movement damper according to claim 2, wherein the flow passage and the radial groove in the flange part are arranged on a common axial section of the piston and discharge directly into one another.

10. The movement damper according to claim 2, wherein the piston and the piston rod comprise two separate parts and the radial grooves in the flange part have different cross-sections.

11. The movement damper according to claim 3, wherein the piston and the piston rod comprise two separate parts and the radial grooves in the flange part have different cross-sections.

* * * * *